US010273820B2

(12) United States Patent
LoRicco et al.

(10) Patent No.: US 10,273,820 B2
(45) Date of Patent: Apr. 30, 2019

(54) TURBINE VANE COOLING ARRANGEMENT

(71) Applicant: United Technologies Corporation, Farmington, CT (US)

(72) Inventors: Nicholas M. LoRicco, Windsor, CT (US); Mark A. Boeke, Plainville, CT (US); Jeffrey J. DeGray, Somers, CT (US); Richard M. Salzillo, Plantsville, CT (US); Dominic J. Mongillo, West Hartford, CT (US)

(73) Assignee: United Technologies Corporation, Farmington, CT (US)

(*) Notice: Subject to any disclaimer, the term of this patent is extended or adjusted under 35 U.S.C. 154(b) by 313 days.

(21) Appl. No.: 15/295,268

(22) Filed: Oct. 17, 2016

(65) Prior Publication Data
US 2018/0106156 A1 Apr. 19, 2018

(51) Int. Cl.
F01D 9/06 (2006.01)

(52) U.S. Cl.
CPC .......... F01D 9/065 (2013.01); F05D 2240/81 (2013.01); F05D 2250/74 (2013.01); F05D 2260/202 (2013.01); Y02T 50/673 (2013.01); Y02T 50/676 (2013.01)

(58) Field of Classification Search
CPC .. F01D 9/065; F05D 2240/81; F05D 2250/74; F05D 2260/202
See application file for complete search history.

(56) References Cited

U.S. PATENT DOCUMENTS

| 8,403,645 B2 | 3/2013 | Barnes et al. |
| 9,803,488 B2* | 10/2017 | Riley ............... F01D 9/041 |
| 2014/0010632 A1 | 1/2014 | Spangler et al. |

* cited by examiner

Primary Examiner — Richard A Edgar
(74) Attorney, Agent, or Firm — Carlson, Gaskey & Olds, P.C.

(57) ABSTRACT

A vane includes a pair of airfoils that have a plurality of film cooling holes that extend through an exterior surface of the airfoils. Each plurality of film cooling holes break through the exterior surface at geometric coordinates in accordance with Cartesian coordinate values of X, Y and Z as set forth in Table 1. Each geometric coordinates is measured from a reference point on a leading edge rail of a platform of the vane.

10 Claims, 4 Drawing Sheets

TURBINE VANE COOLING ARRANGEMENT

BACKGROUND

This disclosure relates to a gas turbine engine, and more particularly to a turbine vane that may be incorporated into a gas turbine engine. The vane's airfoils and platforms include a plurality of film cooling holes as part of a cooling arrangement.

Gas turbine engines typically include a compressor section, a combustor section and a turbine section. During operation, air is pressurized in the compressor section and is mixed with fuel and burned in the combustor section to generate hot combustion gases. The hot combustion gases are communicated through the turbine section, which extracts energy from the hot combustion gases to power the compressor section and other gas turbine engine loads.

Both the compressor and turbine sections may include alternating series of rotating blades and stationary vanes that extend into the core flow path of the gas turbine engine. For example, in the turbine section, turbine blades rotate and extract energy from the hot combustion gases that are communicated along the core flow path of the gas turbine engine. The turbine vanes, which generally do not rotate, guide the airflow and prepare it for the next set of blades.

Each of the blades and vanes include airfoils that extend into the core flow path of the gas turbine engine between inner and outer platforms. Cooling airflow is communicated into an internal core of the airfoil and can be discharged through the plurality of film cooling holes to provide a boundary layer of film cooling air along the external surface of the airfoil and platforms. The film cooling air provides a barrier that protects the underlying substrate of the vane from the hot combustion gases that are communicated within the core flow path. By way of example U.S. Published Patent Application No. 2015/0211376 describes a hole configuration for a turbine vane.

SUMMARY

In one exemplary embodiment a vane includes a pair of airfoils having a plurality of film cooling holes that extend through an exterior surface of the airfoils, wherein each of the plurality of film cooling holes break through the exterior surface at geometric coordinates in accordance with Cartesian coordinate values of X, Y and Z as set forth in Table 1, wherein each of the geometric coordinates is measured from a reference point on a leading edge rail of a platform of the vane.

In another example of the above described vane the Cartesian coordinate values of Table 1 are expressed in inches.

In another example of any of the above described vanes the reference point includes a pin hole of the platform.

In another example of any of the above described vanes the plurality of film cooling holes are spaced along a span of the airfoil body in multiple collinearly aligned rows.

In another example of any of the above described vanes the plurality of film cooling holes are disposed on a pressure side, a suction side and a leading edge of the airfoil body.

In another example of any of the above described vanes a first portion of the plurality of film cooling holes from a point of the airfoil body toward an outer platform are angled toward the outer platform and a second portion of the plurality of film cooling holes from the point toward an inner platform are angled inwardly toward the inner platform.

In another example of any of the above described vanes the airfoils extend between inner and outer platforms, the inner and outer platforms include another plurality of film cooling holes that extend through an exterior surface of the platforms, wherein each of the other plurality of film cooling holes break through the exterior surface at geometric coordinates in accordance with Cartesian coordinate values of X, Y and Z as set forth in Table 2, wherein each of the geometric coordinates is measured from the reference point.

In one exemplary embodiment a vane includes a pair of airfoils extending between inner and outer platforms, the inner and outer platforms include a plurality of film cooling holes that extend through an exterior surface of the platforms, wherein each of the plurality of film cooling holes break through the exterior surface at geometric coordinates in accordance with Cartesian coordinate values of X, Y and Z as set forth in Table 2, wherein each of the geometric coordinates is measured from a reference point on a leading edge rail of a platform of the vane.

In another example of the above described vane the Cartesian coordinate values of Table 2 are expressed in inches.

In another example of any of the above described vanes the reference point includes a pin hole of the platform.

In one exemplary embodiment a vane includes a pair of airfoils extending between inner and outer platforms, the inner and outer platforms include a plurality of film cooling holes that extend through an exterior surface of the platforms, wherein each of the plurality of film cooling holes break through the exterior surface at geometric coordinates in accordance with Cartesian coordinate values of X, Y and Z as set forth in Table 2, wherein each of the geometric coordinates is measured from a reference point on a leading edge rail of a platform of the vane.

In another example of the above described vane the Cartesian coordinate values of Table 2 are expressed in inches.

In another example of any of the above described vanes the reference point includes a pin hole of the platform.

BRIEF DESCRIPTION OF THE DRAWINGS

The disclosure can be further understood by reference to the following detailed description when considered in connection with the accompanying drawings wherein.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

Figure 1:
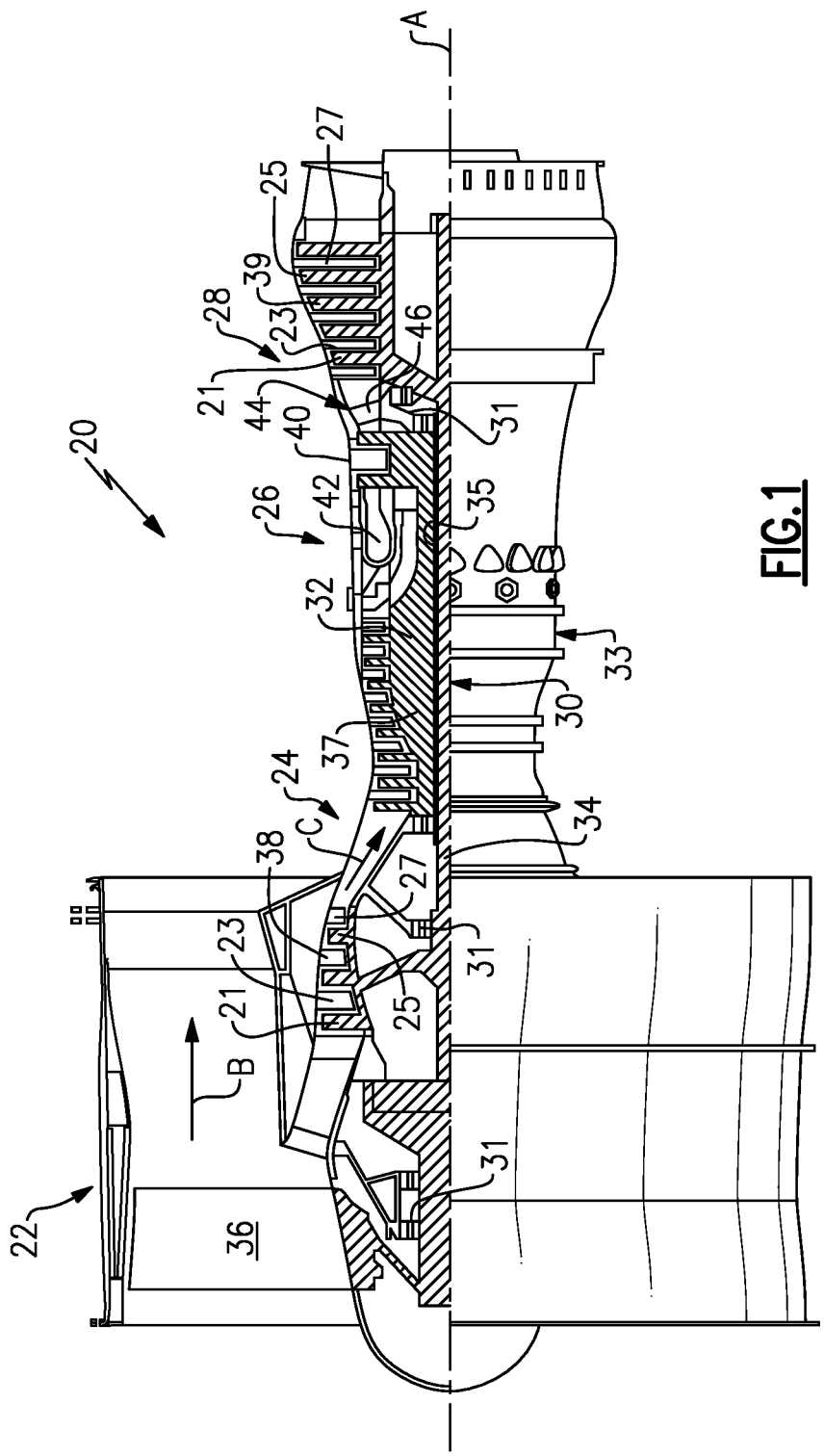
FIG. 1 schematically illustrates a cross-sectional view of a gas turbine engine.

FIG. 1 schematically illustrates a gas turbine engine 20. The exemplary gas turbine engine 20 is a two-spool turbofan engine that generally incorporates a fan section 22, a compressor section 24, a combustor section 26 and a turbine section 28. Alternative engines might include an augmenter section (not shown) among other systems for features. The fan section 22 drives air along a bypass flow path B, while the compressor section 24 drives air along a core flow path C for compression and communication into the combustor section 26. The hot combustion gases generated in the combustor section 26 are expanded through the turbine section 28. Although depicted as a turbofan gas turbine engine in the disclosed non-limiting embodiment, it should be understood that the concepts described herein are not limited to turbofan engines and these teachings could extend to other types of engines, including but not limited to, three-spool engine architectures.

The gas turbine engine 20 generally includes a low speed spool 30 and a high speed spool 32 mounted for rotation about an engine centerline longitudinal axis A. The low speed spool 30 and the high speed spool 32 may be mounted relative to an engine static structure 33 via several bearing systems 31. It should be understood that additional bearing systems 31 may alternatively or additionally be provided.

The low speed spool 30 generally includes an inner shaft 34 that interconnects a fan 36, a low pressure compressor 38 and a low pressure turbine 39. The high speed spool 32 includes an outer shaft 35 that interconnects a high pressure compressor 37 and a high pressure turbine 40. In this embodiment, the inner shaft 34 and the outer shaft 35 are supported at various axial locations by bearing systems 31 positioned within the engine static structure 33.

A combustor 42 is arranged between the high pressure compressor 37 and the high pressure turbine 40. A mid-turbine frame 44 may be arranged generally between the high pressure turbine 40 and the low pressure turbine 39. The mid-turbine frame 44 supports one or more bearing systems 31 of the turbine section 28. The mid-turbine frame 44 may include one or more airfoils 46 that may be positioned within the core flow path C.

The inner shaft 34 and the outer shaft 35 are concentric and rotate via the bearing systems 31 about the engine centerline longitudinal axis A, which is co-linear with their longitudinal axes. The core airflow is compressed by the low pressure compressor 38 and the high pressure compressor 37, is mixed with fuel and burned in the combustor 42, and is then expanded over the high pressure turbine 40 and the low pressure turbine 39. The high pressure turbine 40 and the low pressure turbine 39 rotationally drive the respective high speed spool 32 and the low speed spool 30 in response to the expansion.

In some non-limiting examples, the gas turbine engine 20 is a high-bypass geared aircraft engine. In a further example, the gas turbine engine 20 bypass ratio is greater than about six (6:1). The example gas turbine engine 20 can be a geared turbofan engine that includes an epicyclic gear train, such as a planetary gear system or other gear system. The example epicyclic gear train has a gear reduction ratio of greater than about 2.3, and in another example is greater than about 2.5:1. The geared turbofan enables operation of the low speed spool 30 at higher speeds which can increase the operational efficiency of the low pressure compressor 38 and low pressure turbine 39 and render increased pressure in a fewer number of stages.

The low pressure turbine 39 pressure ratio is pressure measured prior to the inlet of the low pressure turbine 39 as related to the pressure at the outlet of the low pressure turbine 39 prior to an exhaust nozzle of the gas turbine engine 20. In one non-limiting embodiment, the bypass ratio of the gas turbine engine 20 is greater than about ten (10:1), the fan diameter is significantly larger than that of the low pressure compressor 38, and the low pressure turbine 39 has a pressure ratio that is greater than about 5 (5:1). It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.55. In another non-limiting embodiment the low fan pressure ratio is less than about 1.45. In another non-limiting embodiment the low fan pressure ratio is from 1.1 to 1.45. "Low corrected fan tip speed" is the actual fan tip speed in ft/sec divided by an industry standard temperature correction of $[(\text{Tram }°R)/(518.7° R)]^{0.5}$. The "Low corrected fan tip speed" as disclosed herein according to one non-limiting embodiment is less than about 1150 ft/second (350.5 meters/second).

Each of the compressor section 24 and the turbine section 28 may include alternating rows of rotor assemblies and vane assemblies with each of the vane assemblies carrying one or more airfoils. The one or more airfoils extend into the core flow path C. By way of example, the rotor assemblies can carry a plurality of rotating blades 25, while each vane assembly can carry a plurality of vanes 27 that extend into the core flow path C. The blades 25 of the rotor assemblies extract energy (in the form of pressure) from core airflow passing through the gas turbine engine 20. The vanes 27 of the vane assemblies direct core airflow to the blades 25 of the rotor assemblies to adjust the amount of energy extracted by the blades 25.

Various components of the gas turbine engine 20, including airfoils of the compressor section 24 and the turbine section 28, may be subjected to widely ranging temperatures and pressures and may undergo repetitive thermal cycling. The turbine section 28 is particularly subjected to relatively extreme operating conditions. To compensate for the extreme conditions, some components may require airfoil cooling arrangements for cooling the airfoils that extend into the core flow path C. Exemplary airfoil cooling arrangements that include internal cooling circuits and film cooling holes are described herein.

Figure 3:
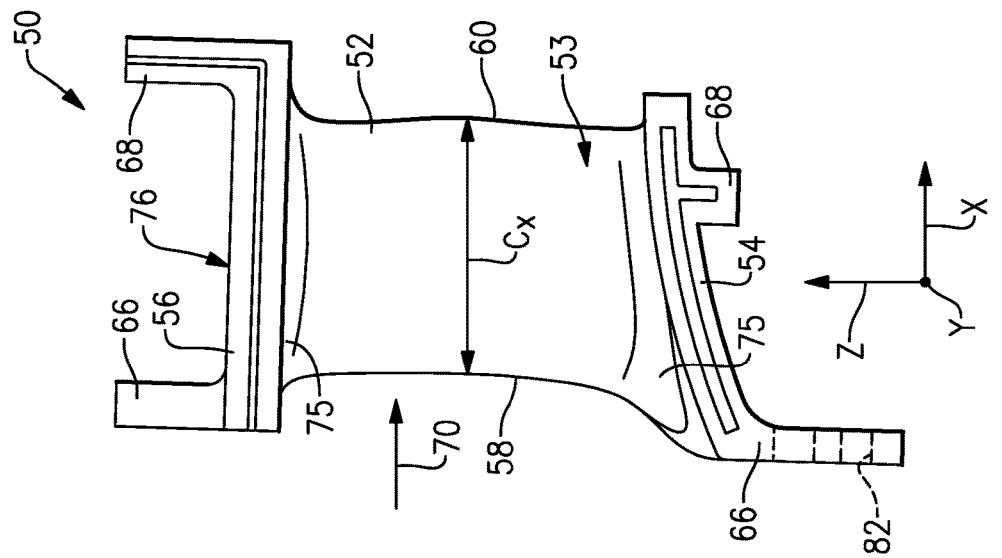
FIG. 3 schematically illustrates a second view of the vane of FIG. 2.
Figure 2:
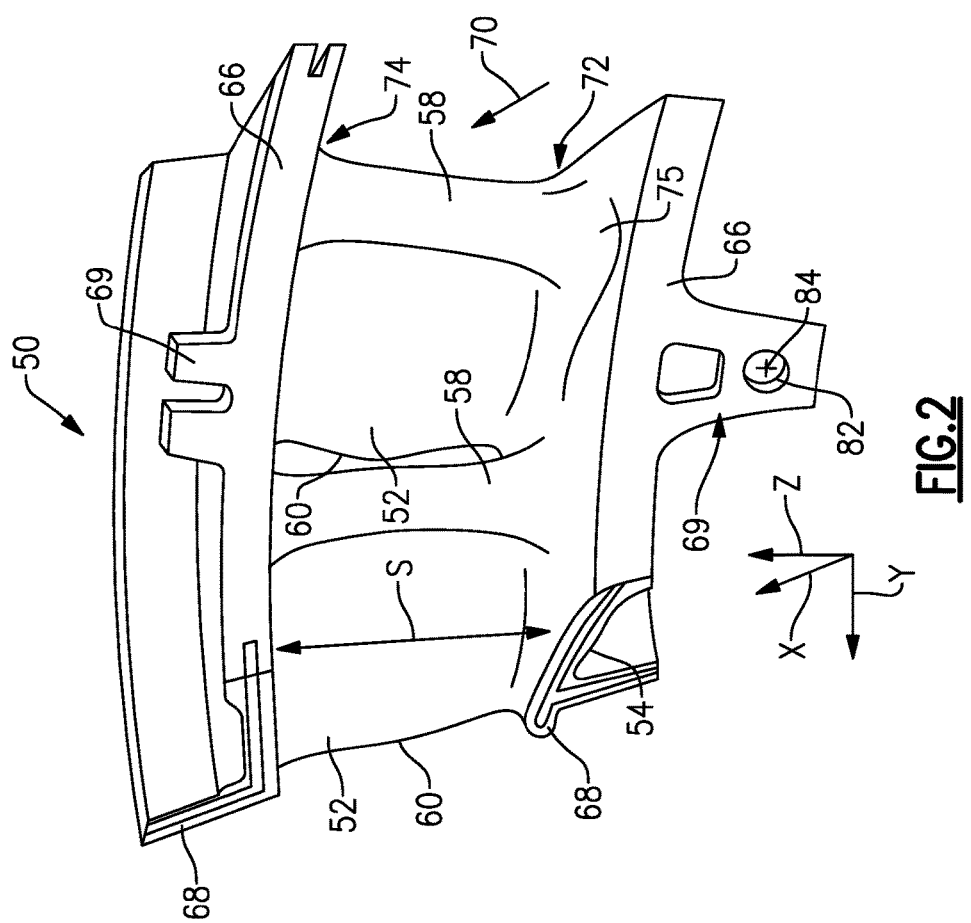
FIG. 2 schematically illustrates a doublet stator vane for incorporation in a gas turbine engine.

FIGS. 2 and 3 illustrate a doublet stator vane 50 for utilization in the gas turbine engine 20 of FIG. 1. In alternative examples, the doublet stator vane 50 can be utilized in similar engines. The doublet stator vane 50 includes a pair of airfoils joined to the same inner and outer platforms. The vane 50 of the exemplary embodiment of FIGS. 2 and 3 is a first stage turbine vane of the turbine section 28. This disclosure is not limited to the exemplary embodiment of FIGS. 2 and 3, and could extend to any vane that is disposed within the core flow path C of the gas turbine engine 20.

The vane 50 includes two airfoils 52, each extending from an inner platform 54 (on an inner diameter side) to an outer platform 56 (on an outer diameter side). Each airfoil 52 includes a leading edge 58, a trailing edge 60, a pressure side 62 and a suction side 64. Each airfoil 52, including the pressure side 62 and the suction side 64, extends along a chord Cx from the leading edge 58 and the trailing edge 60 and extends in span S between the inner platform 54 to the outer platform 56.

A fluid in the gas path 70 is passed axially downstream through the gas turbine engine 20, along the core flow path C, in a direction that extends from the leading edge 58 toward the trailing edge 60 of the airfoil 52. The gas path 70 (for the communication of core airfoil along the core flow path C) extends between an inner gas path 72 associated with the inner platform 54 and an outer gas path 74 associated with the outer platform 56 of the vane 50. The inner platform 54 and the outer platform 56 are connected to the airfoils 52 at the inner and outer gas paths 72, 74 via fillets 75.

Both the inner platform 54 and the outer platform 56 include leading edge rails 66 and trailing edge rails 68. Each of the leading edge rails 66 and the trailing edge rails 68 have one or more engagement features 69 for mounting the vane 50 to the gas turbine engine 20. By way of example, in some cases the leading edge rails 66 and the trailing edge rails 68 are attached to an engine casing. In alternative examples other engagement features and/or configurations are contemplated as within the scope of this disclosure. Alternative engagement features include but are not limited to, hooks, rails, bolts, rivets, tabs and/or any other features that can be incorporated into the vane 50 to retain the vane 50 to the gas turbine engine 20. In the exemplary embodiment of FIGS. 2 and 3, the leading edge rail 66 of the inner platform 54 includes a pin hole 82 having a center point 84 (See FIG. 2).

Figure 4:
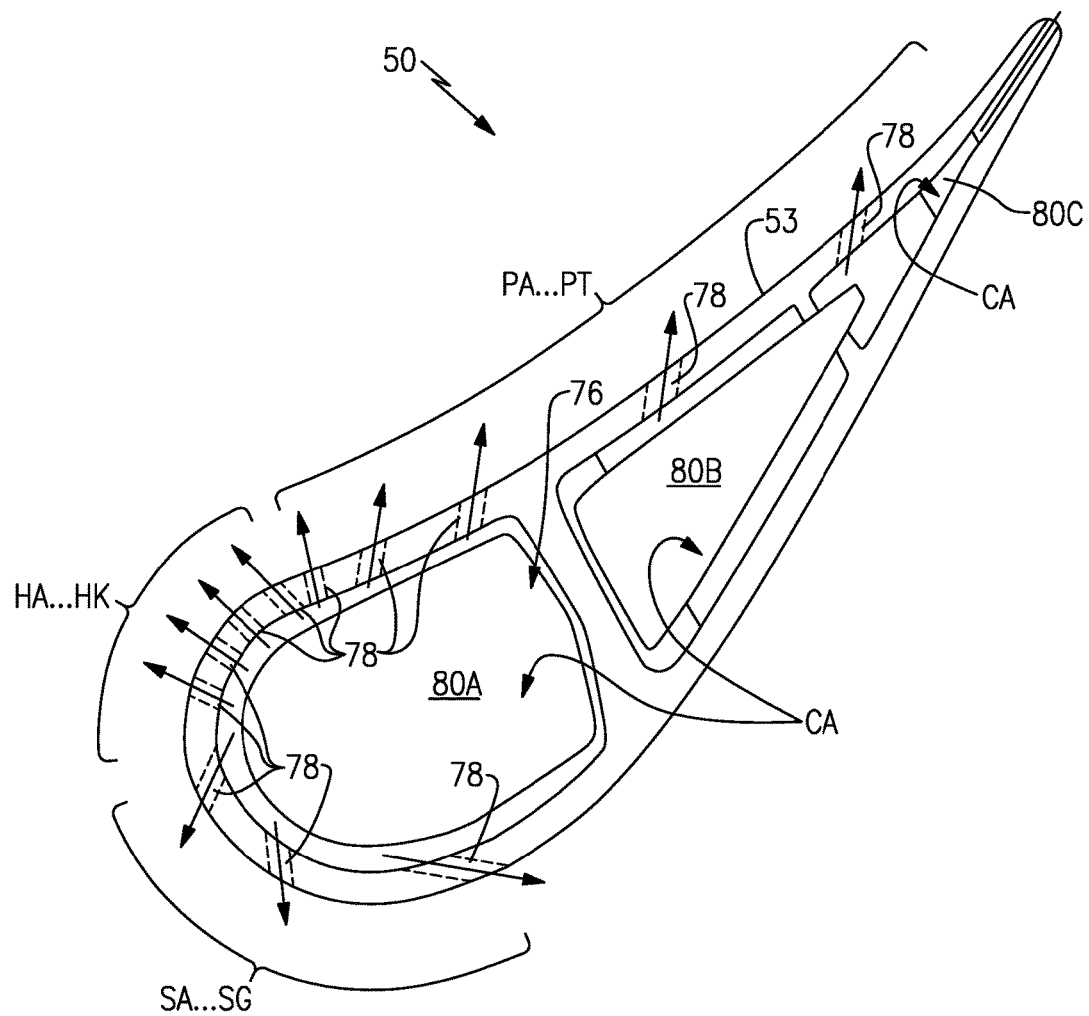
FIG. 4 schematically illustrates a cross-sectional view of an airfoil having multiple film cooling holes as part of an airfoil cooling arrangement.

Referring to FIG. 4, the airfoils 52 include an airfoil cooling arrangement having an internal cooling circuit 76 and multiple film cooling holes 78 that extend through an exterior surface 53 of the airfoil 52. The internal cooling circuit 76 receives a cooling airflow CA to cool the internal surfaces of the airfoil 50 (See FIG. 3). In one example, the cooling airflow CA is a bleed airflow that can be sourced from the compressor section 24. In alternative examples the cooling airflow CA can be sourced from any other portion of the gas turbine engine 20 that is upstream from the vane 50. The internal cooling circuit 76 may include one or more cavities 80 that define hollow openings within each airfoil 52. The cooling airflow CA is communicated through the cavities 80, which extend across an entire length of the airfoil 52, to cool the internal surfaces of the airfoil 52.

The film cooling holes 78 of the airfoil cooling arrangement are formed through the airfoil 52 (between the exterior surface 53 and one or more of the cavities 80) such that each film cooling hole 78 breaks out through the exterior surface 53 of the airfoil 52. In the exemplary embodiment, each of the leading edge 58, the pressure side 62 and the suction side 64 includes a plurality of film cooling holes 78. The film cooling holes 78 may embody a cone shape or a round shape. Other shapes are also contemplated as within the scope of this disclosure.

FIG. 4 illustrates a cross-sectional view of an exemplary airfoil 50. The internal cooling circuit 76 of the airfoil 50 includes multiple cavities 80A-80C that receive cooling airflow CA to cool the internal surfaces of the airfoil 50. Each of the plurality of film cooling holes 78 are in fluid communication with one or more of the cavities 80A-80C. Cooling airflow CA are communicated into and through the cavities 80A-80C and are then discharged through the plurality of film cooling holes 78 to provide a boundary layer of film cooling air along the exterior surface 53 of the airfoil 50. The film cooling air provides a barrier that protects the underlying substrate of the airfoil 50 from the hot combustion gases that are communicated within the core flow path C.

The plurality of film cooling holes 78 are spaced apart along the span S of the airfoil 52 for discharging the cooling airflow CA and providing a boundary layer of film cooling air along the exterior surface 53 of the airfoil 52. In the example embodiment, with reference to FIG. 4 and Table 1, the pressure side 62 includes PA, PB, PC, PD PE, etc. of film cooling holes 78, the suction side 64 includes SA, SB, SC, etc. of film cooling holes 78, and the leading edge 58 includes HA, HB, HC, HD, HE, HF, etc. of film cooling holes 78. Additional holes are included in a practical implementation but are not shown for clarity, as evident from reference to Table 1. Holes identified with the letter "P" refer to the rows of the pressure side 62, holes identified with the letter "S" refer to the rows of the suction side 64, and holes identified with the letter "H" refer to the rows of the leading edge 58. The locations illustrated in FIG. 4 are schematic in nature, and not drawn to scale.

Figure 5A:
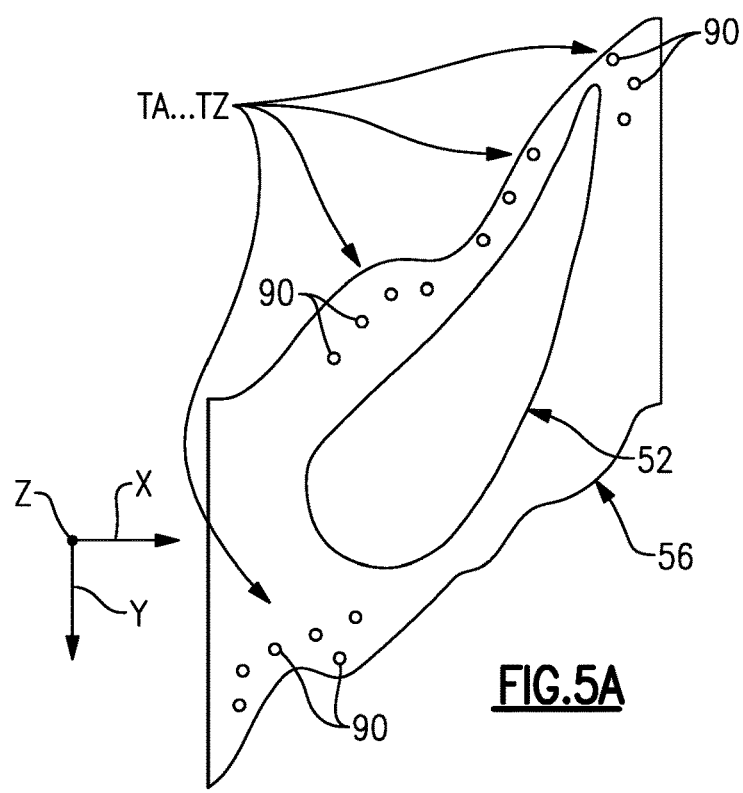
FIGS. 5A and 5B respectively illustrate outer and inner platforms of the vane including a plurality of film cooling holes as part of a platform cooling arrangement of the vane.
Figure 5B:
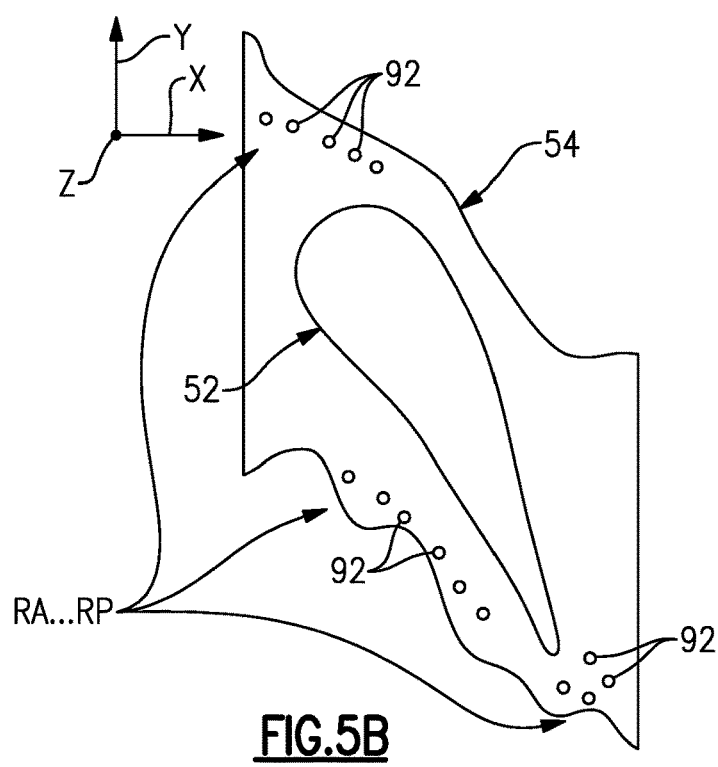

FIGS. 5A and 5B schematically illustrate the outer and inner platforms 56, 54, respectively. The outer and inner platforms 56, 54 include film cooling holes 90, 92. Holes identified with an "R" relate to the inner platform holes, such that the inner platform 54 includes film cooling holes 92 RA, RB, RC, RD, etc. Holes identified with an "T" relate to the outer platform holes, such that the outer platform 56 includes film cooling holes 90 TA, TB, TC, TD, etc. The locations illustrated in FIGS. 5A and 5B are schematic in nature, and not drawn to scale.

The breakout position of each of the film cooling holes 78, 90, 92 refers to the geometric location along the vane 50 at which the film cooling hole centerline breaks through or protrudes out of, the exterior surface of the vane. The breakout points of each of the plurality of film cooling holes can be described in terms of sets of Cartesian coordinates, provided in Table 1 (airfoils) and Table 2 (platforms), defined along x, y and z axes as measured from a specific reference point of the vane 50, as is further discussed below. As shown in FIGS. 2 and 3 (with continued reference to FIG. 1), the x axis is defined along the direction of the engine centerline longitudinal axis A, the y axis is defined in a substantially circumferential or rotational direction about the engine centerline longitudinal axis A, and the z axis is defined in a radial direction that is substantially perpendicular to the engine centerline longitudinal axis A.

In these exemplary embodiments, each of the geometric coordinates are measured from a pin hole 82 of the leading edge rail 66 of the inner platform 54 of the vane 50. By measuring the geometric coordinates (in terms of x, y and z values) from a center point 84 of the pin hole 82, the external break through points of each film cooling holes 78, 90, 92 of the airfoil 52 and inner and outer platforms 54, 56 can be ascertained. The Table 1 and Table 2 values for the x, y and z coordinates represent the true position of a nominal part and are listed in inches in this embodiment. However, the values of the Tables could be converted to millimeters by multiplying by 25.4, or could be converted to any other units. The manufacturing tolerance involved in the location of each film cooling hole 78, 90, 92 is a diameter of approximately between 0 and 0.20 inches (5.08 mm) measured from the surface of the part. In other words, due to manufacturing tolerances, the external breakout of the centerline of each film cooling hole 78 can fall within a 0.20 inch diameter circle inscribed on the surface of the airfoil 50. The variance resultant from the manufacturing tolerance is represented by the ranges of values included in Tables 1 and 2.

Table 1 and Table 2 identify each film cooling hole 78, 90, 92 by assigning a unique, three-letter identifier to each film cooling hole 78. The first two letters of the three-letter identifier identify the row (HA, PA, SA, RA, TA) where the film cooling hole is located. The third letter corresponds to the specific hole number of a particular row identified by the first two letters. The film cooling holes of each row are numbered from the inner platform 54 in a direction toward the outer platform 56, with the letter A representing the film cooling hole 78 closest to the inner platform 54 and subsequent letters assigned to the film cooling holes 78 in a direction toward the outer platform 56 (i.e., B, C, D, etc).

| Slab 1-airfoil cooling holes Position Relative to pin hole centerline | | | |
|---|---|---|---|
| Hole name | x | y | z |
| RAF HOLES | | | |
| HAA.0001 | 0.54-0.14 | 1.3-0.9 | 1.43-1.03 |
| HAB.0002 | 0.6-0.2 | 1.3-0.9 | 1.55-1.15 |
| HAC.0003 | 0.62-0.22 | 1.31-0.91 | 1.7-1.3 |
| HAD.0004 | 0.62-0.22 | 1.33-0.93 | 1.85-1.45 |
| HAE.0005 | 0.62-0.22 | 1.34-0.94 | 1.99-1.59 |
| HAF.0006 | 0.62-0.22 | 1.35-0.95 | 2.05-1.65 |
| HAG.0007 | 0.62-0.22 | 1.36-0.96 | 2.13-1.73 |
| HAH.0008 | 0.63-0.23 | 1.38-0.98 | 2.28-1.88 |
| HAJ.0009 | 0.63-0.23 | 1.39-0.99 | 2.44-2.04 |
| HAK.0010 | 0.63-0.23 | 1.41-1.01 | 2.59-2.19 |
| HAL.0011 | 0.61-0.21 | 1.44-1.04 | 2.7-2.3 |
| HBA.0012 | 0.53-0.13 | 1.21-0.81 | 1.44-1.04 |
| HBB.0013 | 0.59-0.19 | 1.22-0.82 | 1.6-1.2 |
| HBC.0014 | 0.59-0.19 | 1.24-0.84 | 1.78-1.38 |
| HBD.0015 | 0.59-0.19 | 1.25-0.85 | 1.92-1.52 |
| HBE.0016 | 0.59-0.19 | 1.27-0.87 | 2.06-1.66 |
| HBF.0017 | 0.59-0.19 | 1.28-0.88 | 2.12-1.72 |
| HBG.0018 | 0.59-0.19 | 1.29-0.89 | 2.21-1.81 |
| HBH.0019 | 0.6-0.2 | 1.3-0.9 | 2.34-1.94 |
| HBJ.0020 | 0.6-0.2 | 1.32-0.92 | 2.49-2.09 |
| HBK.0021 | 0.59-0.19 | 1.35-0.95 | 2.66-2.26 |
| HBL.0022 | 0.49-0.09 | 1.4-1 | 2.86-2.46 |
| HCA.0023 | 0.54-0.14 | 1.12-0.72 | 1.42-1.02 |
| HCB.0024 | 0.6-0.2 | 1.14-0.74 | 1.58-1.18 |
| HCC.0025 | 0.6-0.2 | 1.15-0.75 | 1.72-1.32 |
| HCD.0026 | 0.6-0.2 | 1.16-0.76 | 1.86-1.46 |
| HCE.0027 | 0.59-0.19 | 1.18-0.78 | 2-1.6 |
| HCF.0028 | 0.59-0.19 | 1.19-0.79 | 2.14-1.74 |
| HCG.0029 | 0.59-0.19 | 1.2-0.8 | 2.19-1.79 |
| HCH.0030 | 0.59-0.19 | 1.21-0.81 | 2.28-1.88 |
| HCJ.0031 | 0.6-0.2 | 1.23-0.83 | 2.41-2.01 |
| HCK.0032 | 0.6-0.2 | 1.25-0.85 | 2.55-2.15 |
| HCL.0033 | 0.59-0.19 | 1.26-0.86 | 2.67-2.27 |
| HCM.0034 | 0.56-0.16 | 1.26-0.86 | 2.77-2.37 |
| HCN.0035 | 0.5-0.1 | 1.25-0.85 | 2.86-2.46 |
| HDA.0036 | 0.57-0.17 | 1.03-0.63 | 1.42-1.02 |
| HDB.0037 | 0.62-0.22 | 1.06-0.66 | 1.61-1.21 |
| HDC.0038 | 0.62-0.22 | 1.07-0.67 | 1.77-1.37 |
| HDD.0039 | 0.62-0.22 | 1.09-0.69 | 1.91-1.51 |
| HDE.0040 | 0.62-0.22 | 1.1-0.7 | 2.06-1.66 |
| HDF.0041 | 0.62-0.22 | 1.12-0.72 | 2.21-1.81 |
| HDG.0042 | 0.62-0.22 | 1.13-0.73 | 2.26-1.86 |
| HDH.0043 | 0.62-0.22 | 1.15-0.75 | 2.42-2.02 |
| HDJ.0044 | 0.62-0.22 | 1.17-0.77 | 2.57-2.17 |
| HDK.0045 | 0.61-0.21 | 1.18-0.78 | 2.7-2.3 |
| HDL.0046 | 0.58-0.18 | 1.18-0.78 | 2.8-2.4 |
| HDM.0047 | 0.5-0.1 | 1.16-0.76 | 2.9-2.5 |
| HEA.0048 | 0.65-0.25 | 1.11-0.71 | 2.75-2.35 |
| HEB.0049 | 0.61-0.21 | 1.11-0.71 | 2.83-2.43 |
| HFA.0050 | 0.67-0.27 | 1.07-0.67 | 2.83-2.43 |
| HFB.0051 | 0.61-0.21 | 1.06-0.66 | 2.89-2.49 |
| HFC.0052 | 0.72-0.32 | 1.03-0.63 | 2.88-2.48 |
| HFD.0053 | 0.79-0.39 | 1.03-0.63 | 2.86-2.46 |

| Slab 1-airfoil cooling holes Position Relative to pin hole centerline | | | |
|---|---|---|---|
| Hole name | x | y | z |
| PAA.0054 | 1.44-1.04 | 2.44-2.04 | 1.46-1.06 |
| PAA.0055 | 1.44-1.04 | 2.49-2.09 | 1.6-1.2 |
| PAA.0056 | 1.44-1.04 | 2.53-2.13 | 1.73-1.33 |
| PAA.0057 | 1.44-1.04 | 2.56-2.16 | 1.87-1.47 |
| PAA.0058 | 1.44-1.04 | 2.59-2.19 | 2.02-1.62 |
| PAA.0059 | 1.44-1.04 | 2.61-2.21 | 2.16-1.76 |
| PAA.0060 | 1.44-1.04 | 2.62-2.22 | 2.31-1.91 |
| PAA.0061 | 1.44-1.04 | 2.63-2.23 | 2.45-2.05 |
| PAB.0062 | 1.45-1.05 | 2.72-2.32 | 2.56-2.16 |
| PBA.0063 | 1.41-1.01 | 2.4-2 | 1.52-1.12 |
| PBA.0064 | 1.41-1.01 | 2.45-2.05 | 1.66-1.26 |
| PBA.0065 | 1.41-1.01 | 2.49-2.09 | 1.8-1.4 |
| PBA.0066 | 1.42-1.02 | 2.52-2.12 | 1.94-1.54 |
| PBA.0067 | 1.42-1.02 | 2.55-2.15 | 2.08-1.68 |
| PBA.0068 | 1.42-1.02 | 2.57-2.17 | 2.23-1.83 |
| PBA.0069 | 1.42-1.02 | 2.58-2.18 | 2.37-1.97 |
| PCA.0070 | 1.36-0.96 | 2.27-1.87 | 1.47-1.07 |
| PCA.0071 | 1.36-0.96 | 2.32-1.92 | 1.6-1.2 |
| PCA.0072 | 1.36-0.96 | 2.36-1.96 | 1.74-1.34 |
| PCA.0073 | 1.36-0.96 | 2.39-1.99 | 1.88-1.48 |
| PCA.0074 | 1.36-0.96 | 2.42-2.02 | 2.02-1.62 |
| PCA.0075 | 1.36-0.96 | 2.44-2.04 | 2.17-1.77 |
| PCA.0076 | 1.36-0.96 | 2.46-2.06 | 2.31-1.91 |
| PCA.0077 | 1.36-0.96 | 2.47-2.07 | 2.46-2.06 |
| PDA.0078 | 1.26-0.86 | 2.13-1.73 | 1.54-1.14 |
| PDA.0079 | 1.26-0.86 | 2.16-1.76 | 1.68-1.28 |
| PDA.0080 | 1.26-0.86 | 2.2-1.8 | 1.82-1.42 |
| PDA.0081 | 1.26-0.86 | 2.23-1.83 | 1.96-1.56 |
| PDA.0082 | 1.26-0.86 | 2.25-1.85 | 2.1-1.7 |
| PDA.0083 | 1.26-0.86 | 2.27-1.87 | 2.24-1.84 |
| PDA.0084 | 1.26-0.86 | 2.29-1.89 | 2.38-1.98 |
| PDA.0085 | 1.26-0.86 | 2.31-1.91 | 2.52-2.12 |
| PDB.0086 | 1.29-0.89 | 2.38-1.98 | 2.6-2.2 |
| PDC.0087 | 1.23-0.83 | 2.36-1.96 | 2.7-2.3 |
| PEA.0088 | 1.16-0.76 | 1.96-1.56 | 1.53-1.13 |
| PEA.0089 | 1.16-0.76 | 1.98-1.58 | 1.67-1.27 |
| PEA.0090 | 1.15-0.75 | 2-1.6 | 1.82-1.42 |
| PEA.0091 | 1.14-0.74 | 2.02-1.62 | 1.96-1.56 |
| PEA.0092 | 1.14-0.74 | 2.03-1.63 | 2.1-1.7 |
| PEA.0093 | 1.13-0.73 | 2.05-1.65 | 2.25-1.85 |
| PEA.0094 | 1.12-0.72 | 2.06-1.66 | 2.39-1.99 |
| PEA.0095 | 1.12-0.72 | 2.07-1.67 | 2.53-2.13 |
| PEB.0096 | 1.12-0.72 | 2.12-1.72 | 2.67-2.27 |
| PEC.0097 | 1.08-0.68 | 2.1-1.7 | 2.73-2.33 |
| PFA.0098 | 0.94-0.54 | 1.67-1.27 | 1.49-1.09 |
| PFB.0099 | 0.95-0.55 | 1.69-1.29 | 1.66-1.26 |
| PFB.0100 | 0.95-0.55 | 1.71-1.31 | 1.82-1.42 |
| PFB.0101 | 0.95-0.55 | 1.73-1.33 | 1.98-1.58 |
| PFB.0102 | 0.96-0.56 | 1.75-1.35 | 2.14-1.74 |
| PFB.0103 | 0.96-0.56 | 1.78-1.38 | 2.3-1.9 |
| PFB.0104 | 0.97-0.57 | 1.82-1.42 | 2.46-2.06 |
| PGA.0105 | 0.81-0.41 | 1.58-1.18 | 1.42-1.02 |
| PGB.0106 | 0.83-0.43 | 1.54-1.14 | 1.59-1.19 |
| PGC.0107 | 0.83-0.43 | 1.55-1.15 | 1.76-1.36 |
| PGC.0108 | 0.83-0.43 | 1.56-1.16 | 1.92-1.52 |
| PGC.0109 | 0.83-0.43 | 1.58-1.18 | 2.08-1.68 |
| PGC.0110 | 0.84-0.44 | 1.6-1.2 | 2.24-1.84 |
| PGC.0111 | 0.84-0.44 | 1.63-1.23 | 2.4-2 |
| PGC.0112 | 0.84-0.44 | 1.66-1.26 | 2.56-2.16 |
| PHA.0113 | 0.69-0.29 | 1.41-1.01 | 1.54-1.14 |
| PHA.0114 | 0.69-0.29 | 1.41-1.01 | 1.61-1.21 |
| PHA.0115 | 0.7-0.3 | 1.41-1.01 | 1.69-1.29 |
| PHA.0116 | 0.7-0.3 | 1.41-1.01 | 1.77-1.37 |
| PHA.0117 | 0.7-0.3 | 1.42-1.02 | 1.86-1.46 |
| PHA.0118 | 0.7-0.3 | 1.42-1.02 | 1.95-1.55 |
| PHA.0119 | 0.7-0.3 | 1.43-1.03 | 2.03-1.63 |
| PHB.0120 | 0.69-0.29 | 1.44-1.04 | 2.16-1.76 |
| PHB.0121 | 0.7-0.3 | 1.45-1.05 | 2.25-1.85 |
| PHB.0122 | 0.7-0.3 | 1.46-1.06 | 2.34-1.94 |
| PHB.0123 | 0.7-0.3 | 1.47-1.07 | 2.43-2.03 |
| PHB.0124 | 0.7-0.3 | 1.48-1.08 | 2.51-2.11 |
| PHB.0125 | 0.7-0.3 | 1.5-1.1 | 2.6-2.2 |
| PHC.0126 | 0.71-0.31 | 1.52-1.12 | 2.66-2.26 |
| PHD.0127 | 0.71-0.31 | 1.55-1.15 | 2.72-2.32 |

Slab 1-airfoil cooling holes
Position Relative to pin hole centerline

| Hole name | x | y | z |
|---|---|---|---|
| RMA.0128 | 1.35-0.95 | 2.32-1.92 | 1.26-0.86 |
| RMB.0129 | 1.27-0.87 | 2.25-1.85 | 1.23-0.83 |
| RMC.0130 | 1.3-0.9 | 2.21-1.81 | 1.29-0.89 |
| RMD.0131 | 0.59-0.19 | 1.51-1.11 | 1.31-0.91 |
| RME.0132 | 0.49-0.09 | 1.38-0.98 | 1.32-0.92 |
| RMF.0133 | 0.41-0.01 | 1.22-0.82 | 1.29-0.89 |
| RMG.0134 | 0.36--0.04 | 1.1-0.7 | 1.25-0.85 |
| RMH.0135 | 0.47-0.07 | 0.93-0.53 | 1.29-0.89 |
| RMJ.0136 | 0.41-0.01 | 0.89-0.49 | 1.26-0.86 |
| RMK.0137 | 0.47-0.07 | 0.83-0.43 | 1.27-0.87 |
| RML.0138 | 0.6-0.2 | 0.77-0.37 | 1.33-0.93 |
| RMM.0139 | 1.17-0.77 | 1.09-0.69 | 1.42-1.02 |
| RNA.0140 | 1.5-1.1 | 2.05-1.65 | 1.3-0.9 |
| RNB.0141 | 1.49-1.09 | 2.1-1.7 | 1.32-0.92 |
| SAA.0142 | 0.75-0.35 | 0.9-0.5 | 1.5-1.1 |
| SAA.0143 | 0.75-0.35 | 0.92-0.52 | 1.57-1.17 |
| SAA.0144 | 0.75-0.35 | 0.93-0.53 | 1.64-1.24 |
| SAA.0145 | 0.75-0.35 | 0.94-0.54 | 1.71-1.31 |
| SAA.0146 | 0.75-0.35 | 0.95-0.55 | 1.79-1.39 |
| SAA.0147 | 0.75-0.35 | 0.95-0.55 | 1.86-1.46 |
| SAA.0148 | 0.75-0.35 | 0.96-0.56 | 1.94-1.54 |
| SAA.0149 | 0.75-0.35 | 0.97-0.57 | 2.01-1.61 |
| SAA.0150 | 0.75-0.35 | 0.98-0.58 | 2.09-1.69 |
| SAA.0151 | 0.75-0.35 | 0.99-0.59 | 2.16-1.76 |
| SAB.0152 | 0.75-0.35 | 1-0.6 | 2.25-1.85 |
| SAB.0153 | 0.75-0.35 | 1-0.6 | 2.33-1.93 |
| SAB.0154 | 0.74-0.34 | 1.01-0.61 | 2.4-2 |
| SAB.0155 | 0.74-0.34 | 1.02-0.62 | 2.48-2.08 |
| SAB.0156 | 0.74-0.34 | 1.03-0.63 | 2.56-2.16 |
| SAB.0157 | 0.74-0.34 | 1.04-0.64 | 2.63-2.23 |
| SAB.0158 | 0.74-0.34 | 1.05-0.65 | 2.71-2.31 |
| SAB.0159 | 0.74-0.34 | 1.05-0.65 | 2.78-2.38 |
| SBA.0160 | 0.98-0.58 | 0.96-0.56 | 1.51-1.11 |
| SBA.0161 | 0.98-0.58 | 0.97-0.57 | 1.58-1.18 |
| SBA.0162 | 0.98-0.58 | 0.98-0.58 | 1.66-1.26 |
| SBA.0163 | 0.98-0.58 | 0.99-0.59 | 1.74-1.34 |
| SBA.0164 | 0.99-0.59 | 1-0.6 | 1.82-1.42 |
| SBA.0165 | 0.99-0.59 | 1-0.6 | 1.89-1.49 |
| SBA.0166 | 0.99-0.59 | 1.01-0.61 | 1.97-1.57 |
| SBA.0167 | 0.99-0.59 | 1.02-0.62 | 2.05-1.65 |
| SBA.0168 | 1-0.6 | 1.03-0.63 | 2.13-1.73 |
| SBA.0169 | 1-0.6 | 1.04-0.64 | 2.2-1.8 |
| SBA.0170 | 1-0.6 | 1.05-0.65 | 2.28-1.88 |
| SBA.0171 | 1-0.6 | 1.05-0.65 | 2.36-1.96 |
| SBA.0172 | 1-0.6 | 1.06-0.66 | 2.44-2.04 |
| SBA.0173 | 1-0.6 | 1.07-0.67 | 2.51-2.11 |
| SBA.0174 | 1-0.6 | 1.08-0.68 | 2.59-2.19 |
| SBA.0175 | 1-0.6 | 1.09-0.69 | 2.67-2.27 |
| SBA.0176 | 1-0.6 | 1.1-0.7 | 2.75-2.35 |
| SBA.0177 | 1-0.6 | 1.11-0.71 | 2.82-2.42 |
| SBB.0178 | 0.98-0.58 | 1.08-0.68 | 2.87-2.47 |
| SCA.0179 | 1.14-0.74 | 1.14-0.74 | 1.53-1.13 |
| SCA.0180 | 1.14-0.74 | 1.14-0.74 | 1.6-1.2 |
| SCA.0181 | 1.14-0.74 | 1.15-0.75 | 1.68-1.28 |
| SCA.0182 | 1.14-0.74 | 1.16-0.76 | 1.76-1.36 |
| SCA.0183 | 1.14-0.74 | 1.16-0.76 | 1.84-1.44 |
| SCA.0184 | 1.14-0.74 | 1.17-0.77 | 1.92-1.52 |
| SCA.0185 | 1.14-0.74 | 1.18-0.78 | 1.99-1.59 |
| SCA.0186 | 1.14-0.74 | 1.18-0.78 | 2.07-1.67 |
| SCA.0187 | 1.14-0.74 | 1.19-0.79 | 2.15-1.75 |
| SCA.0188 | 1.13-0.73 | 1.2-0.8 | 2.23-1.83 |
| SCA.0189 | 1.13-0.73 | 1.2-0.8 | 2.3-1.9 |
| SCA.0190 | 1.13-0.73 | 1.21-0.81 | 2.38-1.98 |
| SCA.0191 | 1.13-0.73 | 1.22-0.82 | 2.46-2.06 |
| SCA.0192 | 1.13-0.73 | 1.23-0.83 | 2.54-2.14 |
| SCA.0193 | 1.13-0.73 | 1.23-0.83 | 2.61-2.21 |
| SCA.0194 | 1.13-0.73 | 1.24-0.84 | 2.69-2.29 |
| SCB.0195 | 1.08-0.68 | 1.18-0.78 | 2.75-2.35 |
| SCC.0196 | 1.08-0.68 | 1.19-0.79 | 2.81-2.41 |
| SDA.0197 | 1.52-1.12 | 2.37-1.97 | 2.61-2.21 |
| SDB.0198 | 1.58-1.18 | 2.57-2.17 | 2.59-2.19 |
| SDC.0199 | 1.56-1.16 | 2.44-2.04 | 2.65-2.25 |
| TCH.0200 | 1.62-1.22 | 2.57-2.17 | 2.65-2.25 |
| TCJ.0201 | 1.64-1.24 | 2.74-2.34 | 2.61-2.21 |
| TDA.0202 | 1.45-1.05 | 2.82-2.42 | 2.62-2.22 |
| TPA.0203 | 0.61-0.21 | 1.74-1.34 | 2.89-2.49 |
| TPB.0204 | 0.49-0.09 | 1.77-1.37 | 2.92-2.52 |
| TPC.0205 | 0.65-0.25 | 1.62-1.22 | 2.83-2.43 |
| TPD.0206 | 0.54-0.14 | 1.64-1.24 | 2.89-2.49 |
| TPE.0207 | 0.56-0.16 | 1.52-1.12 | 2.82-2.42 |
| TPF.0208 | 0.48-0.08 | 1.46-1.06 | 2.88-2.48 |
| TPG.0209 | 0.41-0.01 | 1.52-1.12 | 2.94-2.54 |
| TPH.0210 | 0.4-0 | 1.31-0.91 | 2.94-2.54 |
| TPJ.0211 | 0.42-0.02 | 1.17-0.77 | 2.96-2.56 |
| TPK.0212 | 0.42-0.02 | 1.08-0.68 | 2.98-2.58 |
| TPL.0213 | 0.42-0.02 | 0.99-0.59 | 2.99-2.59 |
| TPM.0214 | 0.56-0.16 | 0.95-0.55 | 2.99-2.59 |
| TRA.0215 | 1.31-0.91 | 1.41-1.01 | 2.88-2.48 |
| TRB.0216 | 1.26-0.86 | 1.43-1.03 | 2.84-2.44 |
| LAF HOLES | | | |
| HGA.0001 | 0.55-0.15 | −0.3--0.7 | 1.39-0.99 |
| HGB.0002 | 0.6-0.2 | −0.31--0.71 | 1.5-1.1 |
| HGC.0003 | 0.62-0.22 | −0.33--0.73 | 1.66-1.26 |
| HGD.0004 | 0.62-0.22 | −0.35--0.75 | 1.8-1.4 |
| HGE.0005 | 0.62-0.22 | −0.36--0.76 | 1.95-1.55 |
| HGF.0006 | 0.62-0.22 | −0.36--0.76 | 2-1.6 |
| HGG.0007 | 0.62-0.22 | −0.37--0.77 | 2.09-1.69 |
| HGH.0008 | 0.63-0.23 | −0.38--0.78 | 2.24-1.84 |
| HGJ.0009 | 0.63-0.23 | −0.4--0.8 | 2.4-2 |
| HGK.0010 | 0.63-0.23 | −0.41--0.81 | 2.56-2.16 |
| HGL.0011 | 0.61-0.21 | −0.4--0.8 | 2.67-2.27 |
| HHA.0012 | 0.54-0.14 | −0.38--0.78 | 1.38-0.98 |
| HHB.0013 | 0.59-0.19 | −0.4--0.8 | 1.54-1.14 |
| HHC.0014 | 0.59-0.19 | −0.42--0.82 | 1.72-1.32 |
| HHD.0015 | 0.59-0.19 | −0.43--0.83 | 1.86-1.46 |
| HHE.0016 | 0.59-0.19 | −0.45--0.85 | 2.01-1.61 |
| HHF.0017 | 0.59-0.19 | −0.45--0.85 | 2.06-1.66 |
| HHG.0018 | 0.59-0.19 | −0.45--0.85 | 2.15-1.75 |
| HHH.0019 | 0.6-0.2 | −0.46--0.86 | 2.29-1.89 |
| HHJ.0020 | 0.6-0.2 | −0.47--0.87 | 2.43-2.03 |
| HHK.0021 | 0.59-0.19 | −0.48--0.88 | 2.61-2.21 |
| HHL.0022 | 0.49-0.09 | −0.48--0.88 | 2.81-2.41 |
| HJA.0023 | 0.54-0.14 | −0.47--0.87 | 1.35-0.95 |
| HJB.0024 | 0.6-0.2 | −0.48--0.88 | 1.51-1.11 |
| HJC.0025 | 0.6-0.2 | −0.5--0.9 | 1.65-1.25 |
| HJD.0026 | 0.6-0.2 | −0.51--0.91 | 1.79-1.39 |
| HJE.0027 | 0.59-0.19 | −0.52--0.92 | 1.93-1.53 |
| HJF.0028 | 0.59-0.19 | −0.53--0.93 | 2.07-1.67 |
| HJG.0029 | 0.59-0.19 | −0.54--0.94 | 2.12-1.72 |
| HJH.0030 | 0.59-0.19 | −0.54--0.94 | 2.21-1.81 |
| HJJ.0031 | 0.6-0.2 | −0.55--0.95 | 2.34-1.94 |
| HJK.0032 | 0.6-0.2 | −0.56--0.96 | 2.48-2.08 |
| HJL.0033 | 0.59-0.19 | −0.57--0.97 | 2.6-2.2 |
| HJM.0034 | 0.56-0.16 | −0.59--0.99 | 2.7-2.3 |
| HJN.0035 | 0.51-0.11 | −0.62--1.02 | 2.79-2.39 |
| HKA.0036 | 0.57-0.17 | −0.56--0.96 | 1.33-0.93 |
| HKB.0037 | 0.62-0.22 | −0.57--0.97 | 1.52-1.12 |
| HKC.0038 | 0.62-0.22 | −0.58--0.98 | 1.68-1.28 |
| HKD.0039 | 0.62-0.22 | −0.59--0.99 | 1.82-1.42 |
| HKE.0040 | 0.62-0.22 | −0.61--1.01 | 1.97-1.57 |
| HKF.0041 | 0.62-0.22 | −0.62--1.02 | 2.12-1.72 |
| HKG.0042 | 0.62-0.22 | −0.62--1.02 | 2.18-1.78 |
| HKH.0043 | 0.62-0.22 | −0.63--1.03 | 2.33-1.93 |
| HKJ.0044 | 0.62-0.22 | −0.64--1.04 | 2.48-2.08 |
| HKK.0045 | 0.61-0.21 | −0.66--1.06 | 2.62-2.22 |
| HKL.0046 | 0.58-0.18 | −0.67--1.07 | 2.72-2.32 |
| HKM.0047 | 0.5-0.1 | −0.72--1.12 | 2.81-2.41 |
| PKA.0048 | 1.44-1.04 | 0.82-0.42 | 1.64-1.24 |
| PKA.0049 | 1.44-1.04 | 0.84-0.44 | 1.78-1.38 |
| PKA.0050 | 1.44-1.04 | 0.85-0.45 | 1.93-1.53 |
| PKA.0051 | 1.44-1.04 | 0.86-0.46 | 2.07-1.67 |
| PKA.0052 | 1.44-1.04 | 0.86-0.46 | 2.22-1.82 |
| PKA.0053 | 1.44-1.04 | 0.85-0.45 | 2.36-1.96 |
| PKA.0054 | 1.44-1.04 | 0.84-0.44 | 2.51-2.11 |
| PKA.0055 | 1.44-1.04 | 0.81-0.41 | 2.66-2.26 |
| PKB.0056 | 1.42-1.02 | 0.81-0.41 | 2.78-2.38 |
| PLA.0057 | 1.41-1.01 | 0.77-0.37 | 1.7-1.3 |

Slab 1-airfoil cooling holes
Position Relative to pin hole centerline

| Hole name | x | y | z |
|---|---|---|---|
| PLA.0058 | 1.41-1.01 | 0.79-0.39 | 1.84-1.44 |
| PLA.0059 | 1.41-1.01 | 0.8-0.4 | 1.98-1.58 |
| PLA.0060 | 1.42-1.02 | 0.8-0.4 | 2.13-1.73 |
| PLA.0061 | 1.42-1.02 | 0.8-0.4 | 2.27-1.87 |
| PLA.0062 | 1.42-1.02 | 0.8-0.4 | 2.42-2.02 |
| PLA.0063 | 1.42-1.02 | 0.78-0.38 | 2.56-2.16 |
| PMA.0064 | 1.36-0.96 | 0.65-0.25 | 1.61-1.21 |
| PMA.0065 | 1.36-0.96 | 0.67-0.27 | 1.76-1.36 |
| PMA.0066 | 1.36-0.96 | 0.69-0.29 | 1.9-1.5 |
| PMA.0067 | 1.36-0.96 | 0.69-0.29 | 2.05-1.65 |
| PMA.0068 | 1.36-0.96 | 0.69-0.29 | 2.19-1.79 |
| PMA.0069 | 1.36-0.96 | 0.69-0.29 | 2.34-1.94 |
| PMA.0070 | 1.36-0.96 | 0.68-0.28 | 2.48-2.08 |
| PMA.0071 | 1.36-0.96 | 0.66-0.26 | 2.63-2.23 |
| PNA.0072 | 1.26-0.86 | 0.5-0.1 | 1.66-1.26 |
| PNA.0073 | 1.26-0.86 | 0.51-0.11 | 1.81-1.41 |
| PNA.0074 | 1.26-0.86 | 0.51-0.11 | 1.95-1.55 |
| PNA.0075 | 1.26-0.86 | 0.51-0.11 | 2.09-1.69 |
| PNA.0076 | 1.26-0.86 | 0.51-0.11 | 2.24-1.84 |
| PNA.0077 | 1.26-0.86 | 0.51-0.11 | 2.38-1.98 |
| PNA.0078 | 1.26-0.86 | 0.5-0.1 | 2.52-2.12 |
| PNA.0079 | 1.26-0.86 | 0.48-0.08 | 2.66-2.26 |
| PNB.0080 | 1.29-0.89 | 0.54-0.14 | 2.75-2.35 |
| PPA.0081 | 1.16-0.76 | 0.34--0.06 | 1.62-1.22 |
| PPA.0082 | 1.16-0.76 | 0.33--0.07 | 1.76-1.36 |
| PPA.0083 | 1.15-0.75 | 0.32--0.08 | 1.91-1.51 |
| PPA.0084 | 1.14-0.74 | 0.31--0.09 | 2.05-1.65 |
| PPA.0085 | 1.14-0.74 | 0.3--0.1 | 2.19-1.79 |
| PPA.0086 | 1.13-0.73 | 0.28--0.12 | 2.34-1.94 |
| PPA.0087 | 1.12-0.72 | 0.26--0.14 | 2.48-2.08 |
| PPA.0088 | 1.12-0.72 | 0.25--0.15 | 2.62-2.22 |
| PRA.0089 | 0.94-0.54 | 0.06--0.34 | 1.53-1.13 |
| PRB.0090 | 0.95-0.55 | 0.05--0.35 | 1.69-1.29 |
| PRB.0091 | 0.95-0.55 | 0.03--0.37 | 1.85-1.45 |
| PRB.0092 | 0.95-0.55 | 0.02--0.38 | 2.01-1.61 |
| PRB.0093 | 0.96-0.56 | 0.02--0.38 | 2.17-1.77 |
| PRB.0094 | 0.96-0.56 | 0.02--0.38 | 2.34-1.94 |
| PRB.0095 | 0.97-0.57 | 0.02--0.38 | 2.5-2.1 |
| PSA.0096 | 0.81-0.41 | -0.01--0.41 | 1.44-1.04 |
| PSB.0097 | 0.83-0.43 | -0.09--0.49 | 1.6-1.2 |
| PSC.0098 | 0.83-0.43 | -0.11--0.51 | 1.76-1.36 |
| PSC.0099 | 0.83-0.43 | -0.13--0.53 | 1.93-1.53 |
| PSC.0100 | 0.83-0.43 | -0.15--0.55 | 2.09-1.69 |
| PSC.0101 | 0.84-0.44 | -0.16--0.56 | 2.25-1.85 |
| PSC.0102 | 0.84-0.44 | -0.16--0.56 | 2.41-2.01 |
| PSC.0103 | 0.84-0.44 | -0.16--0.56 | 2.57-2.17 |
| PTA.0104 | 0.69-0.29 | -0.2--0.6 | 1.52-1.12 |
| PTA.0105 | 0.69-0.29 | -0.22--0.62 | 1.59-1.19 |
| PTA.0106 | 0.7-0.3 | -0.24--0.64 | 1.67-1.27 |
| PTA.0107 | 0.7-0.3 | -0.25--0.65 | 1.75-1.35 |
| PTA.0108 | 0.7-0.3 | -0.26--0.66 | 1.83-1.43 |
| PTA.0109 | 0.7-0.3 | -0.27--0.67 | 1.92-1.52 |
| PTA.0110 | 0.7-0.3 | -0.28--0.68 | 2.01-1.61 |
| PTB.0111 | 0.69-0.29 | -0.3--0.7 | 2.13-1.73 |
| PTB.0112 | 0.7-0.3 | -0.31--0.71 | 2.22-1.82 |
| PTB.0113 | 0.7-0.3 | -0.31--0.71 | 2.31-1.91 |
| PTB.0114 | 0.7-0.3 | -0.32--0.72 | 2.4-2 |
| PTB.0115 | 0.7-0.3 | -0.32--0.72 | 2.49-2.09 |
| PTB.0116 | 0.7-0.3 | -0.33--0.73 | 2.58-2.18 |
| RLA.0117 | 1.44-1.04 | 0.97-0.57 | 1.41-1.01 |
| RLB.0118 | 1.33-0.93 | 0.71-0.31 | 1.41-1.01 |
| RLC.0119 | 0.61-0.21 | 0.04--0.36 | 1.3-0.9 |
| RLD.0120 | 0.51-0.11 | -0.06--0.46 | 1.28-0.88 |
| RLE.0121 | 0.41-0.01 | -0.16--0.56 | 1.24-0.84 |
| RLF.0122 | 0.42-0.02 | -0.28--0.68 | 1.25-0.85 |
| RLG.0123 | 0.45-0.05 | -0.44--0.84 | 1.25-0.85 |
| RLH.0124 | 0.42-0.02 | -0.54--0.94 | 1.18-0.78 |
| RLJ.0125 | 0.5-0.1 | -0.69--1.09 | 1.17-0.77 |
| RLK.0126 | 0.59-0.19 | -0.68--1.08 | 1.23-0.83 |
| RLL.0127 | 1.56-1.16 | 0.67-0.27 | 1.44-1.04 |
| RLM.0128 | 1.6-1.2 | 0.76-0.36 | 1.42-1.02 |
| SFA.0129 | 0.75-0.35 | -0.7--1.1 | 1.38-0.98 |
| SFA.0130 | 0.75-0.35 | -0.69--1.09 | 1.45-1.05 |
| SFA.0131 | 0.75-0.35 | -0.7--1.1 | 1.52-1.12 |
| SFA.0132 | 0.75-0.35 | -0.7--1.1 | 1.6-1.2 |
| SFA.0133 | 0.75-0.35 | -0.71--1.11 | 1.67-1.27 |
| SFA.0134 | 0.75-0.35 | -0.71--1.11 | 1.75-1.35 |
| SFA.0135 | 0.75-0.35 | -0.72--1.12 | 1.82-1.42 |
| SFA.0136 | 0.75-0.35 | -0.73--1.13 | 1.9-1.5 |
| SFA.0137 | 0.75-0.35 | -0.73--1.13 | 1.97-1.57 |
| SFA.0138 | 0.75-0.35 | -0.74--1.14 | 2.05-1.65 |
| SFB.0139 | 0.75-0.35 | -0.75--1.15 | 2.14-1.74 |
| SFB.0140 | 0.75-0.35 | -0.76--1.16 | 2.21-1.81 |
| SFB.0141 | 0.74-0.34 | -0.76--1.16 | 2.29-1.89 |
| SFB.0142 | 0.74-0.34 | -0.77--1.17 | 2.37-1.97 |
| SFB.0143 | 0.74-0.34 | -0.78--1.18 | 2.44-2.04 |
| SFB.0144 | 0.74-0.34 | -0.78--1.18 | 2.52-2.12 |
| SFB.0145 | 0.74-0.34 | -0.79--1.19 | 2.6-2.2 |
| SFB.0146 | 0.74-0.34 | -0.8--1.2 | 2.67-2.27 |
| SGA.0147 | 1.14-0.74 | -0.47--0.87 | 1.45-1.05 |
| SGA.0148 | 1.14-0.74 | -0.48--0.88 | 1.53-1.13 |
| SGA.0149 | 1.14-0.74 | -0.49--0.89 | 1.61-1.21 |
| SGA.0150 | 1.14-0.74 | -0.5--0.9 | 1.69-1.29 |
| SGA.0151 | 1.14-0.74 | -0.51--0.91 | 1.76-1.36 |
| SGA.0152 | 1.14-0.74 | -0.51--0.91 | 1.84-1.44 |
| SGA.0153 | 1.14-0.74 | -0.52--0.92 | 1.92-1.52 |
| SGA.0154 | 1.14-0.74 | -0.53--0.93 | 2-1.6 |
| SGA.0155 | 1.14-0.74 | -0.54--0.94 | 2.07-1.67 |
| SGA.0156 | 1.13-0.73 | -0.55--0.95 | 2.15-1.75 |
| SGA.0157 | 1.13-0.73 | -0.56--0.96 | 2.23-1.83 |
| SGA.0158 | 1.13-0.73 | -0.56--0.96 | 2.31-1.91 |
| SGA.0159 | 1.13-0.73 | -0.57--0.97 | 2.38-1.98 |
| SGA.0160 | 1.13-0.73 | -0.58--0.98 | 2.46-2.06 |
| SGA.0161 | 1.13-0.73 | -0.59--0.99 | 2.54-2.14 |
| SGA.0162 | 1.13-0.73 | -0.6--1 | 2.62-2.22 |
| SGB.0163 | 1.08-0.68 | -0.67--1.07 | 2.66-2.26 |
| SGC.0164 | 1.08-0.68 | -0.67--1.07 | 2.73-2.33 |
| TNA.0165 | 1.34-0.94 | 0.81-0.41 | 2.88-2.48 |
| TNB.0166 | 1.31-0.91 | 0.71-0.31 | 2.88-2.48 |
| TNC.0167 | 0.83-0.43 | 0.18--0.22 | 2.96-2.56 |
| TND.0168 | 0.54-0.14 | -0.18--0.58 | 2.92-2.52 |
| TNE.0169 | 0.45-0.05 | -0.3--0.7 | 2.91-2.51 |
| TNF.0170 | 0.45-0.05 | -0.42--0.82 | 2.87-2.47 |
| TNG.0171 | 0.4-0 | -0.51--0.91 | 2.89-2.49 |
| TNH.0172 | 0.46-0.06 | -0.66--1.06 | 2.83-2.43 |
| TNJ.0173 | 0.4-0 | -0.72--1.12 | 2.87-2.47 |
| TNK.0174 | 0.45-0.05 | -0.81--1.21 | 2.86-2.46 |
| TNL.0175 | 0.48-0.08 | -0.91--1.31 | 2.85-2.45 |
| TNM.0176 | 0.58-0.18 | -0.88--1.28 | 2.83-2.43 |
| TNN.0177 | 0.74-0.34 | -0.93--1.33 | 2.85-2.45 |
| TNP.0178 | 0.87-0.47 | -0.88--1.28 | 2.81-2.41 |
| TNR.0179 | 1.22-0.82 | -0.62--1.02 | 2.82-2.42 |
| TNS.0180 | 1.3-0.9 | -0.57--0.97 | 2.84-2.44 |
| TNT.0181 | 1.48-1.08 | -0.05--0.45 | 2.86-2.46 |
| TNU.0182 | 1.64-1.24 | 0.77-0.37 | 2.84-2.44 |

TABLE 2 platform cooling holes

Position Relative to pin hole centerline

| Hole name | x | y | z |
|---|---|---|---|
| OD PLATFORM | | | |
| TAA.0001 | 1.68-1.28 | -0.37--0.77 | 2.79-2.39 |
| TBA.0002 | 1.63-1.23 | -0.15--0.55 | 2.82-2.42 |
| TBB.0003 | 1.62-1.22 | -0.03--0.43 | 2.83-2.43 |
| TBC.0004 | 1.62-1.22 | 0.09--0.31 | 2.84-2.44 |
| TBD.0005 | 1.62-1.22 | 0.21--0.19 | 2.85-2.45 |
| TCA.0006 | 1.62-1.22 | 1.38-0.98 | 2.82-2.42 |
| TCB.0007 | 1.62-1.22 | 1.51-1.11 | 2.82-2.42 |
| TCC.0008 | 1.62-1.22 | 1.66-1.26 | 2.81-2.41 |
| TCD.0009 | 1.62-1.22 | 1.83-1.43 | 2.79-2.39 |
| TCE.0010 | 1.63-1.23 | 2.03-1.63 | 2.77-2.37 |

TABLE 2-continued platform cooling holes

| Hole name | Position Relative to pin hole centerline | | |
|---|---|---|---|
| | x | y | z |
| TCF.0011 | 1.63-1.23 | 2.21-1.81 | 2.74-2.34 |
| TCG.0012 | 1.63-1.23 | 2.4-2 | 2.7-2.3 |
| TDB.0013 | 1.37-0.97 | 2.69-2.29 | 2.67-2.27 |
| TDC.0014 | 1.27-0.87 | 2.61-2.21 | 2.71-2.31 |
| TDD.0015 | 1.2-0.8 | 2.52-2.12 | 2.74-2.34 |
| TEA.0016 | 1.25-0.85 | 0.82-0.42 | 2.91-2.51 |
| TEB.0017 | 1.09-0.69 | 0.95-0.55 | 2.95-2.55 |
| TFB.0018 | 0.94-0.54 | 0.77-0.37 | 2.99-2.59 |
| TFC.0019 | 0.84-0.44 | 0.83-0.43 | 3.01-2.61 |
| TFD.0020 | 0.94-0.54 | 0.92-0.52 | 2.98-2.58 |
| TGA.0021 | 1.08-0.68 | 0.49-0.09 | 2.94-2.54 |
| TGB.0022 | 0.98-0.58 | 0.53-0.13 | 2.97-2.57 |
| TGC.0023 | 0.88-0.48 | 0.58-0.18 | 3-2.6 |
| THA.0024 | 0.78-0.38 | 0.26--0.14 | 2.98-2.58 |
| THB.0025 | 0.73-0.33 | 0.33--0.07 | 2.99-2.59 |
| THC.0026 | 0.69-0.29 | 0.43-0.03 | 3-2.6 |
| TJA.0027 | 0.71-0.31 | 0.62-0.22 | 3.02-2.62 |
| TJC.0028 | 0.63-0.23 | 0.76-0.36 | 3.01-2.61 |
| TKA.0029 | 0.59-0.19 | 0.87-0.47 | 3-2.6 |
| TLA.0030 | 1.11-0.71 | 2.42-2.02 | 2.78-2.38 |
| TLB.0031 | 1.03-0.63 | 2.25-1.85 | 2.82-2.42 |
| TLC.0032 | 1-0.6 | 2.35-1.95 | 2.83-2.43 |
| TLD.0033 | 0.93-0.53 | 2.15-1.75 | 2.86-2.46 |
| TLE.0034 | 0.89-0.49 | 2.26-1.86 | 2.86-2.46 |
| TLF.0035 | 0.8-0.4 | 2.13-1.73 | 2.88-2.48 |
| TMA.0036 | 0.64-0.24 | 0.03--0.37 | 2.95-2.55 |
| TSA.0037 | 1.56-1.16 | -0.6--1 | 2.76-2.36 |
| TSB.0038 | 1.46-1.06 | -0.59--0.99 | 2.81-2.41 |
| TSC.0039 | 1.27-0.87 | -0.77--1.17 | 2.82-2.42 |
| TTA.0040 | 1.46-1.06 | -0.49--0.89 | 2.82-2.42 |
| TTB.0041 | 1.56-1.16 | -0.46--0.86 | 2.79-2.39 |
| TTC.0042 | 1.45-1.05 | -0.39--0.79 | 2.84-2.44 |
| TTD.0043 | 1.52-1.12 | -0.28--0.68 | 2.84-2.44 |
| TTE.0044 | 1.55-1.15 | -0.12--0.52 | 2.84-2.44 |
| TUA.0045 | 1.67-1.27 | -0.63--1.03 | 2.82-2.42 |
| TUB.0046 | 1.59-1.19 | -0.69--1.09 | 2.8-2.4 |
| TUC.0047 | 1.5-1.1 | -0.75--1.15 | 2.82-2.42 |
| TUD.0048 | 1.42-1.02 | -0.82--1.22 | 2.83-2.43 |
| TUE.0049 | 1.29-0.89 | -0.91--1.31 | 2.85-2.45 |
| TUF.0050 | 1.24-0.84 | -0.95--1.35 | 2.85-2.45 |
| TUG.0051 | 0.57-0.17 | -1.45--1.85 | 2.82-2.42 |
| TUH.0052 | 0.49-0.09 | -1.51--1.91 | 2.8-2.4 |
| TVA.0053 | 1.63-1.23 | 3.04-2.64 | 2.61-2.21 |
| TVB.0054 | 1.54-1.14 | 2.98-2.58 | 2.62-2.22 |
| TVC.0055 | 1.45-1.05 | 2.92-2.52 | 2.67-2.27 |
| TVD.0056 | 1.38-0.98 | 2.87-2.47 | 2.7-2.3 |
| TVE.0057 | 0.54-0.14 | 2.29-1.89 | 2.93-2.53 |
| TVF.0058 | 0.46-0.06 | 2.22-1.82 | 2.93-2.53 |
| TWA.0059 | 1.76-1.36 | -0.28--0.68 | 2.88-2.48 |
| TWB.0060 | 1.76-1.36 | 0.92-0.52 | 2.92-2.52 |
| TWC.0061 | 1.76-1.36 | 1.17-0.77 | 2.91-2.51 |
| TWD.0062 | 1.76-1.36 | 1.42-1.02 | 2.9-2.5 |
| TWE.0063 | 1.76-1.36 | 2.85-2.45 | 2.69-2.29 |
| TYA.0064 | 1.21-0.81 | 1.03-0.63 | 2.93-2.53 |
| TYB.0065 | 1.37-0.97 | 1.08-0.68 | 2.9-2.5 |
| TYC.0066 | 1.41-1.01 | 1-0.6 | 2.88-2.48 |
| TZA.0067 | 0.6-0.2 | -0.97--1.37 | 2.85-2.45 |
| TZB.0068 | 0.62-0.22 | -1.1--1.5 | 2.84-2.44 |
| TZC.0069 | 0.44-0.04 | 0.04--0.36 | 2.96-2.56 |
| TZD.0070 | 0.44-0.04 | 0.23--0.17 | 2.98-2.58 |
| TZE.0071 | 0.44-0.04 | 0.42-0.02 | 2.98-2.58 |
| TZF.0072 | 0.45-0.05 | 0.64-0.24 | 2.99-2.59 |
| TZG.0073 | 0.44-0.04 | 0.83-0.43 | 2.99-2.59 |
| ID PLATFORM | | | |
| RAA.0001 | 1.59-1.19 | -0.23--0.63 | 1.35-0.95 |
| RAB.0002 | 1.53-1.13 | -0.26--0.66 | 1.34-0.94 |
| RAC.0003 | 1.45-1.05 | -0.31--0.71 | 1.33-0.93 |
| RAD.0004 | 1.39-0.99 | -0.33--0.73 | 1.32-0.92 |
| RBA.0005 | 1.55-1.15 | 0.29--0.11 | 1.39-0.99 |
| RBB.0006 | 1.52-1.12 | 0.33--0.07 | 1.39-0.99 |
| RBC.0007 | 1.5-1.1 | 0.39--0.01 | 1.4-1 |
| RBD.0008 | 1.59-1.19 | 0.14--0.26 | 1.38-0.98 |
| RBE.0009 | 1.48-1.08 | 0.1--0.3 | 1.37-0.97 |
| RCA.0010 | 1.51-1.11 | 1.14-0.74 | 1.4-1 |
| RCB.0011 | 1.52-1.12 | 1.31-0.91 | 1.38-0.98 |
| RDA.0012 | 1.59-1.19 | 1.62-1.22 | 1.35-0.95 |
| RDB.0013 | 1.58-1.18 | 1.79-1.39 | 1.33-0.93 |
| RDC.0014 | 1.58-1.18 | 1.87-1.47 | 1.32-0.92 |
| RDD.0015 | 1.57-1.17 | 1.94-1.54 | 1.3-0.9 |
| REA.0016 | 1.22-0.82 | 0.96-0.56 | 1.39-0.99 |
| RFA.0017 | 1.09-0.69 | 0.51-0.11 | 1.37-0.97 |
| RFB.0018 | 1.08-0.68 | 0.64-0.24 | 1.36-0.96 |
| RFC.0019 | 1.04-0.64 | 0.8-0.4 | 1.37-0.97 |
| RGA.0020 | 0.89-0.49 | 0.36--0.04 | 1.34-0.94 |
| RGB.0021 | 0.83-0.43 | 0.43-0.03 | 1.31-0.91 |
| RGC.0022 | 0.81-0.41 | 0.54-0.14 | 1.32-0.92 |
| RGD.0023 | 0.82-0.42 | 0.73-0.33 | 1.37-0.97 |
| RHA.0024 | 0.65-0.25 | 0.63-0.23 | 1.33-0.93 |
| RJA.0025 | 1.01-0.61 | 2.03-1.63 | 1.25-0.85 |
| RJB.0026 | 0.88-0.48 | 1.99-1.59 | 1.22-0.82 |
| RKA.0027 | 0.43-0.03 | -0.74--1.14 | 1.13-0.73 |
| RPA.0028 | 0.4-0 | 1.78-1.38 | 1.11-0.71 |

Although the different non-limiting embodiments are illustrated as having specific components, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should also be understood that although a particular component arrangement is disclosed and illustrated in these exemplary embodiments, other arrangements could also benefit from the teachings of this disclosure.

In some examples, such as examples utilizing the above described hole placement and configurations of tables 1 and 2, the doublet stator vane is constructed using a casting process, with some or all of the film cooling holes being defined by a casting die. In alternative examples a portion of the film cooling holes can be created post casting using a machining process such as an electrical discharge machining (EDM) process, or the like.

The foregoing description shall be interpreted as illustrative and not in any limiting sense. A worker of ordinary skill in the art would recognize that various modifications could come within the scope of this disclosure. For these reasons, the following claims should be studied to determine the true scope and content of this disclosure.

What is claimed is:

1. A vane comprising:
a pair of airfoils having a plurality of film cooling holes that extend through an exterior surface of said airfoils, wherein each of said plurality of film cooling holes break through said exterior surface at geometric coordinates in accordance with Cartesian coordinate values of X, Y and Z as set forth in Table 1, wherein each of said geometric coordinates is measured from a reference point on a leading edge rail of a platform of the vane.

2. The vane as recited in claim 1, wherein said Cartesian coordinate values of Table 1 are expressed in inches.

3. The vane as recited in claim 1, wherein said reference point includes a pin hole of said platform.

4. The vane as recited in claim 1, wherein said plurality of film cooling holes are spaced along a span of said airfoil body in multiple collinearly aligned rows.

5. The vane as recited in claim 1, wherein said plurality of film cooling holes are disposed on a pressure side, a suction side and a leading edge of said airfoil body.

6. The vane as recited in claim 1, wherein a first portion of said plurality of film cooling holes from a point of said airfoil body toward an outer platform are angled toward said outer platform and a second portion of said plurality of film cooling holes from said point toward an inner platform are angled inwardly toward said inner platform.

7. The vane as recited in claim 1, wherein the airfoils extend between inner and outer platforms, the inner and outer platforms include another plurality of film cooling holes that extend through an exterior surface of said platforms, wherein each of said other plurality of film cooling holes break through said exterior surface at geometric coordinates in accordance with Cartesian coordinate values of X, Y and Z as set forth in Table 2, wherein each of said geometric coordinates is measured from the reference point.

8. A vane comprising:
a pair of airfoils extending between inner and outer platforms, the inner and outer platforms include a plurality of film cooling holes that extend through an exterior surface of said platforms, wherein each of said plurality of film cooling holes break through said exterior surface at geometric coordinates in accordance with Cartesian coordinate values of X, Y and Z as set forth in Table 2, wherein each of said geometric coordinates is measured from a reference point on a leading edge rail of a platform of the vane.

9. The vane as recited in claim 8, wherein said Cartesian coordinate values of Table 2 are expressed in inches.

10. The vane as recited in claim 8, wherein said reference point includes a pin hole of said platform.

* * * * *